May 2, 1950     A. L. LEE     2,506,460
ARTICULATED LOCOMOTIVE
Filed Sept. 4, 1945     3 Sheets-Sheet 1
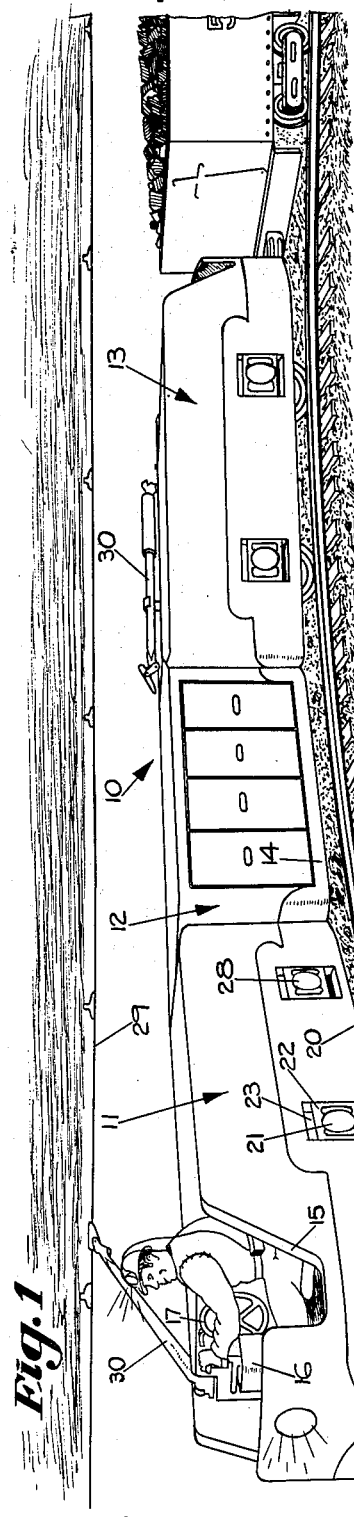
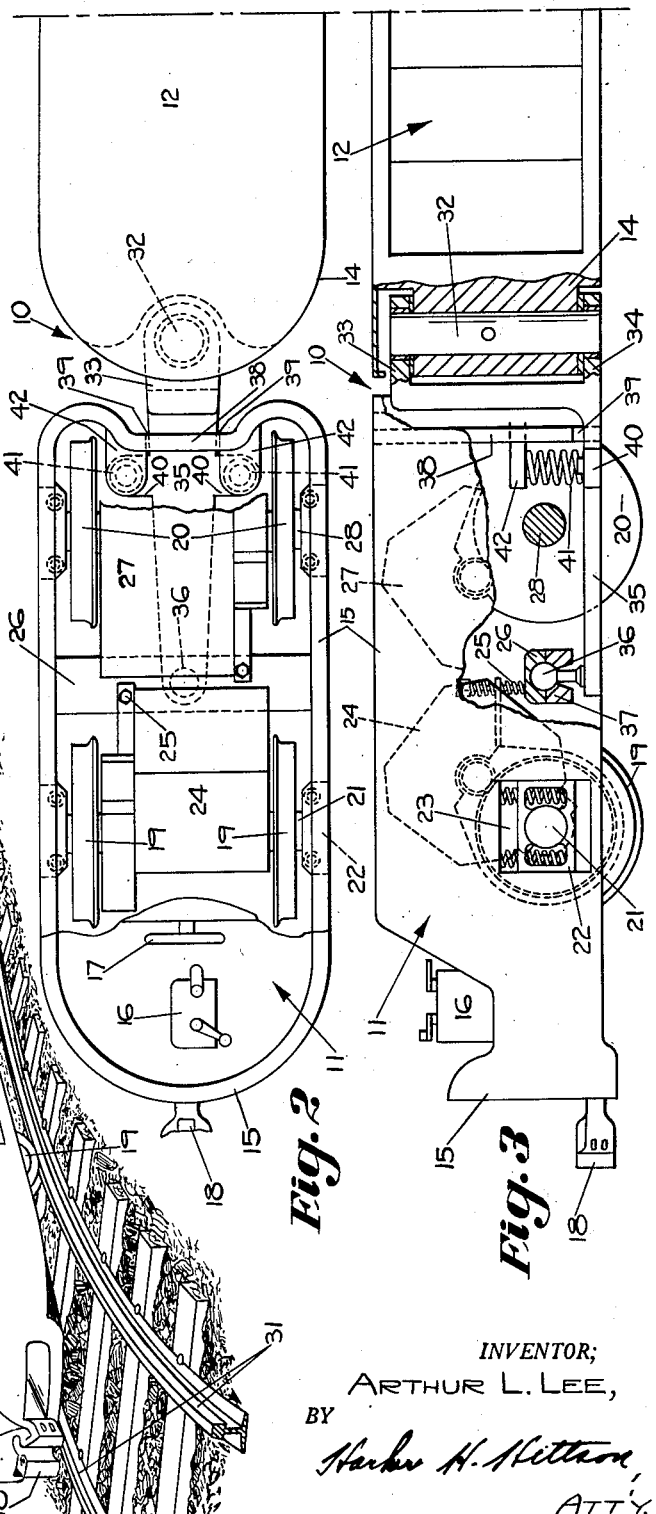
INVENTOR;
ARTHUR L. LEE,
BY
*Harker H. Hittson,*
ATT'Y.

May 2, 1950 — A. L. LEE — 2,506,460
ARTICULATED LOCOMOTIVE
Filed Sept. 4, 1945 — 3 Sheets-Sheet 2
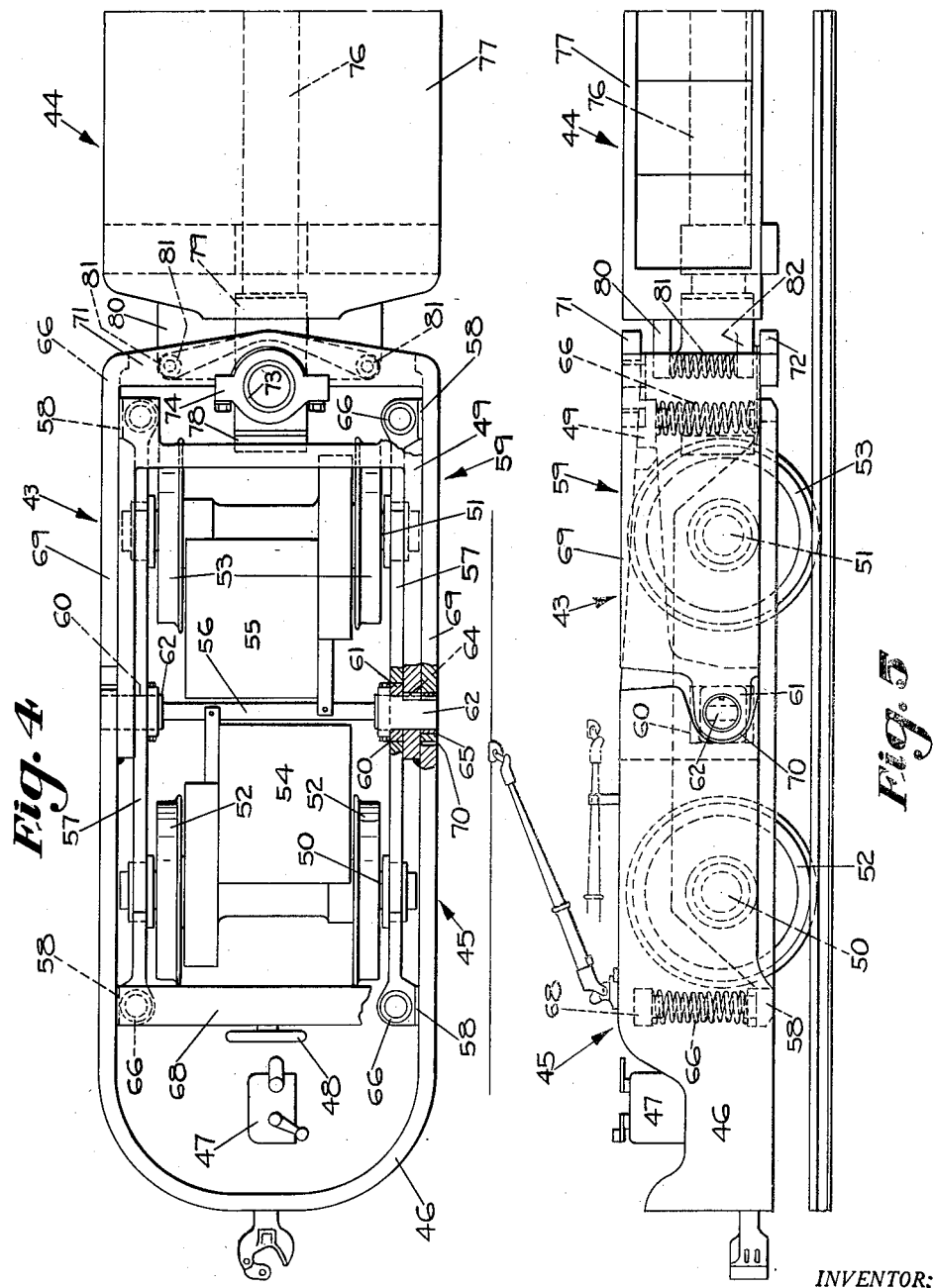
INVENTOR;
ARTHUR L. LEE,
BY Harker H. Stitson,
ATT'Y.

May 2, 1950  A. L. LEE  2,506,460
ARTICULATED LOCOMOTIVE
Filed Sept. 4, 1945  3 Sheets-Sheet 3
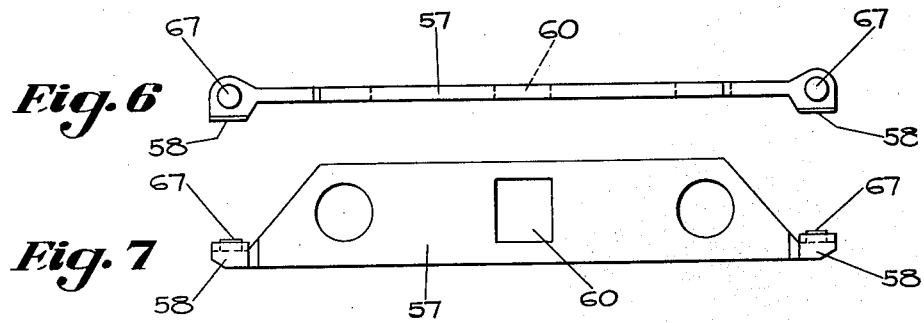
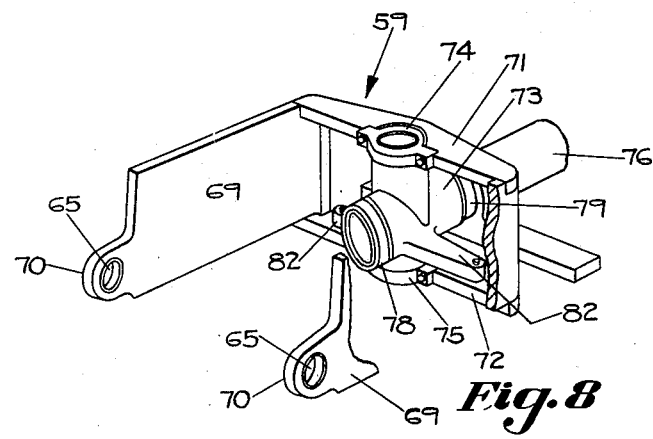
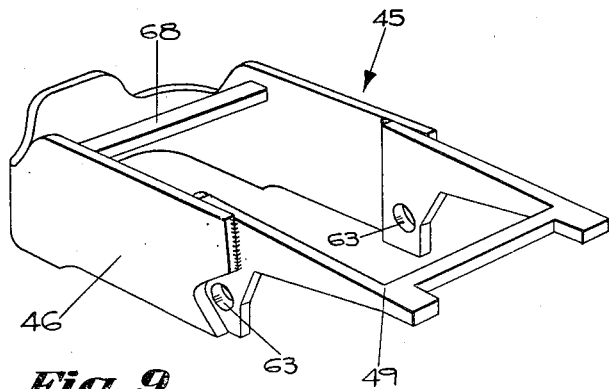
INVENTOR;
ARTHUR L. LEE,
BY
*Harker H. Nittson*
ATT'Y Patented May 2, 1950

2,506,460

UNITED STATES PATENT OFFICE 2,506,460

ARTICULATED LOCOMOTIVE

Arthur L. Lee, Upper Arlington, Ohio, assignor, by mesne assignments, to The Jeffrey Manufacturing Company, a corporation of Ohio Application September 4, 1945, Serial No. 614,117

17 Claims. (Cl. 105—175)

This invention relates to an electric locomotive, particularly of the type adapted for use in coal and other mines.

An object of the invention is to provide a large, heavy locomotive of this type, preferably having eight driving wheels; the locomotive being constructed with low overall height and with ability to turn on relatively sharp curves.

Another object of the invention is to provide a locomotive or a locomotive frame involving a pair of trucks or power driven frames connected in tandem, each preferably provided with four motor driven traction wheels, the trucks or frames being interconnected by an intermediate frame body or section which is supported entirely by the end trucks and which preferably provides a carriage for controllers and the like for the locomotive.

Other objects of the invention will appear hereinafter, the novel features and combinations being set forth in the appended claims.

In the accompanying drawings,

Fig. 1 is a perspective view of a locomotive incorporating the features of my invention shown in operation on a curved track in a coal mine;

Fig. 2 is a plan view, with parts removed, showing the construction of half of the locomotive, it being understood that the other half is of similar construction;

Fig. 3 is a side view, with parts in section, of half of the locomotive of Figs. 1 and 2;

Figs. 4 and 5 are plan and side elevational views, respectively, with parts removed and other parts in section, of half of a modified form of locomotive, it being understood that the other half thereof is of similar or duplicate construction;

Fig. 6 is a plan view of one of the frame members of the locomotive of Fig. 5;

Fig. 7 is a side elevational view of the frame member of Fig. 6;

Fig. 8 is a perspective view, with parts broken away, showing a yoke type drawbar which interconnects the frame of one of the trucks of the locomotive of Figs. 4 and 5 with the frame of the intermediate section thereof; and Fig. 9 is a perspective view of the main frame of one of the trucks of the locomotive of Figs. 4 and 5.

Referring to Figs. 1, 2 and 3 of the drawings, wherein one embodiment of my invention is illustrated, it will be seen that the locomotive includes an articulated main frame 10, the principal parts of which are formed by three longitudinally aligned interconnected sections or compartments 11, 12 and 13. Sections 11 and 13 are similar trucks and the construction of truck 11 will be described in detail hereinafter, it being understood that it applies equally to truck 13. Section 12 is an intermediate section which includes an intermediate frame 14 and provides a casing, enclosure or housing which supports and encloses control devices, rheostats, contactors and the like, for controlling the motors of the trucks 11 and 13. The intermediate section 12 is symmetrically arranged and is connected at opposite ends to the trucks 11 and 13 by a similar structure, that by which it is connected to truck 11 being described in detail hereinafter.

Referring particularly to Figs. 2 and 3 of the drawings, it will be seen that the truck 11 includes a main frame 15 which provides an operator's station at its front end adjacent which there is a controller 16 and a brake wheel 17, the front curved portion of the main frame 15 providing a bumper and carrying a car coupling 18. The main frame 15 is preferably formed of a heavy steel plate.

Each of the trucks 11 and 13 is provided with four motor driven traction wheels which are connected in pairs to transversely extending axles, the pairs of wheels for the truck 11 being designated 19 and 20, respectively. Wheels 19 are rigidly attached to a shaft or axle 21 journaled in self-aligning bearings in spaced boxes 22 which are spring supported and mounted for up and down sliding movement in receiving openings 23 in the parallel longitudinally extending side walls of the main frame 15. Axle 21 and wheels 19 are driven from an electric motor 24, preferably through a single reduction drive in a manner well known in the locomotive art. The electric motor 24 is in part supported by journal bearings on the axle 21 and in part by spring supporting means 25 carried on a cross frame member 26, the ends of which are rigidly attached to and form a part of the main frame 15.

Wheels 20 are similarly driven from a motor 27 which drives them through an axle or shaft 28 through single speed reducing gearing, the motor 27 being supported on cross member 26 by spring means similar to spring means 25. Axle 28 is mounted in the main frame 15 in substantially the same manner that axle 21 is mounted therein.

Current for operating the motors 24 and 27 is collected from an overhead trolley 29 through a trolley pole 30 provided with a collecting shoe, the other line for the electric circuit extending through rails 31 of the track upon which the locomotive travels, in a manner which is well understood in the art.

As previously mentioned, the truck 13 is similar to the truck 11. At its opposite ends the intermediate or control carrying section or frame 12 is connected to the trucks 11 and 13 by similar structure. That for connecting one end to the truck 11 will now be described.

The frame 14 of intermediate section 12 carries an upstanding cylindrical post 32, the top and bottom of which are pivotally journaled to top and bottom lugs 33 and 34, respectively, of a drawbar 35. Thus there is a pivotal connection to a vertical or upright axis between one end of the drawbar 35 and the intermediate section 12 which holds the intermediate section 12 rigid against pivotal movement on any horizontal axis. The left-hand end of the drawbar 35, as viewed in Figs. 2 and 3, is provided with an upstanding ball connector 36 which is received in a split socket 37 formed in or attached to the cross frame member 26, thus providing a universal ball and socket connection between said end of the drawbar 35 and the truck 11 or truck frame 15, located between wheels 19 and 20.

The ball and socket connection thus provided permits limited universal pivotal movement between the drawbar 35 and the main frame 15 of the truck 11. Of particular importance in equally distributing the weight on wheels 19 and 20 is the fact that pivotal movement between the drawbar 35 and the main frame 15 is provided so that drawbar 35 may swing in an upright plane or on a transverse horizontal axis substantially midway between the opposite end pairs of wheels 19 and 20, as well as on a longitudinally extending horizontal axis. The pulling and load transferring connection between the frame 15 and drawbar 35 is also on this axis as provided by said ball and socket connection.

It is furthermore to be noted that the drawbar 35 through its ball and socket connection with the frame 15 provides a direct support for one end of the interconnecting frame 14 of the intermediate section 12. In other words, the two trucks 11 and 13 are pivotally connected through the frame 14 of the intermediate section 12 and the drawbar 35 and its duplicate, the former being adjacent and connected to the truck 11, the latter adjacent and connected to the truck 13.

It is to be noted that the main body of the drawbar 35 extends below the axis of axle 28 and it passes under an integral end member 38 of the frame 15. At this point, the end member 38 is notched, as illustrated at 39, so that on opposite sides it forms abutments which provide a limited amount of clearance between the drawbar 35 and the abutting portions of end member 38. This provides for a limited amount of pivotal movement of the drawbar 35 in a horizontal plane, or, in other words, about the upright axis of the ball 36; this swinging or pivotal movement being limited by the drawbar 35 striking one side or the other of the notch 39 in the end member 38.

In addition to this pivotal movement which will aid the rather long articulated main frame 10 in traveling around a sharp curve, additional pivotal movement is provided adjacent each end of the intermediate section 12 by virtue of the pivotal connection between the bifurcated end of the drawbar 35, represented particularly by the lugs 33 and 34, and the upstanding or vertical shaft or post 32. It is to be noted that this upright pivotal axis is entirely outside the longitudinal dimensions or boundaries of truck 11 which places it longitudinally outwardly of an upright transverse plane adjacent the outer peripheries of adjacent truck wheels 20. This swinging movement between the drawbar 35 and the intermediate section 12, or between the truck 11 and the intermediate section 12, is quite appreciable and is limited by the clearance between the curved or rounded end of the intermediate section 12 and the opposite curved bumper-like portions of the main frame 15 which are clearly illustrated in Fig. 2 of the drawings.

The universal joint 36, 37 provides for relative rotation between the truck 11 and the intermediate section 12 or, more specifically, between the truck 11 and the drawbar 35 on a longitudinally extending horizontal axis, thus preventing development of stresses and strains in the intermediate section 12. However, it is necessary to give stability to the intermediate section 12 since it is supported entirely from the trucks 11 and 13 and yet provides for their relative movement as well as relative movement between each of them and the intermediate section on said longitudinally extending horizontal axis. This stability between intermediate section 12 and the truck 11 is realized by virtue of a pair of oppositely and transversely extending wings 40 carried by the drawbar 35 and provided with cups which receive spaced coil springs 41, the upper ends of which abut spaced projections or lugs 42 on opposite sides of the center line of the main frame 15 and formed integral therewith. It is also evident that the spaced springs 41 are on opposite sides of a vertical plane passing through the ball 36 and post 32.

It is obvious that any rotational movement of the intermediate section 12 on a longitudinally extending horizontal axis will be transferred to the drawbar 35 and through the springs 41 to the frame 15 of the truck 11, such springs 41 permitting limited amount of relative movement between said intermediate section 12 and truck 11 about said longitudinally extending horizontal axis which is resisted by said springs. The opposite end of the intermediate section 12 is connected to the truck 13 by mechanism, which is a duplicate of that above described, for connecting the one end to the truck 11.

From the above description it is obvious that each of the sections 11, 12 and 13 is free to pivot through a limited degree with respect to the other two of said sections about transverse and longitudinal horizontal axes. Furthermore, swinging movement is provided between the intermediate section 12 and each truck 11 and 13 about two spaced upright axes, one along the axis of ball 36, the other along the axis of post 32. This makes four spaced-apart upright axes about which the truck 11 can pivot with respect to the truck 13, thus insuring ability of the complete locomotive to turn on a sharp curve.

Furthermore, the intermediate section 12 is supported entirely from the two trucks 11 and 13 by virtue of the fact that opposite ends thereof are supported from trucks 11 and 13, respectively. The connection provided allows for the articulation above mentioned, but provides a structure which is essentially rigid in a horizontal plane, insofar as the intermediate section 12 and the two connecting drawbars are concerned.

Therefore, there are only two points of pivotal movement on horizontal transverse axes between the trucks 11 and 13, one being along the horizontal axis of the ball 36, the other along the horizontal axis of a similar ball connected to truck 13. Stated another way, there is a single point of pivotal connection on a horizontal transverse axis between each end of the intermediate section 12 and its supporting truck 11 or 13. Also, there is a single longitudinally extending horizontal axis about which the intermediate section 12 can pivot with respect to each of the trucks 11 and 13, this being a longitudinally extending axis passing through the centers of ball 36 and its duplicate.

In the operation of this device, as the locomotive travels over mine rails, for example, while drawing the cars of a coal train, it is obvious that articulation about upright axes is permitted between the various sections 11, 12 and 13 so that it can go around sharp curves. Furthermore, the trucks 11 and 13 are free to pivot relative to each other on two spaced-apart transverse horizontal axes and on a longitudinally extending horizontal axis, thus providing all the necessary or desired freedom of relative movement of the trucks 11 and 13 which may be required by unevenness in the rails 31. The intermediate section 12 which supports motor controls, relays, resistors, etc., is pivotally connected to both of the trucks 11 and 13 and is supported thereby and furthermore provides a main connecting frame between them. A powerful locomotive may be produced by virtue of the fact that eight driving wheels are provided which are driven by four driving motors and this it does without sacrifice of the flexibility of the locomotive which would be inherent if eight driving wheels were attempted to be attached to a single rigid main frame.

In Figs. 4 to 9, inclusive, I have shown a modified form of locomotive, it being understood, however, that this form, like that of Figs. 1, 2 and 3, involves a pair of similar trucks and an intermediate section, thereby providing a single locomotive with four driving motors and eight driving wheels.

The locomotive of Figs. 4 to 9, inclusive, includes three interconnecting sections generally similar to sections 11, 12 and 13 of the locomotive of Figs. 1 to 3, and which include a pair of similar end trucks, one of which is seen at 43, and an intermediate section which is similarly constructed on opposite ends and substantially half of which is illustrated and seen at 44. The intermediate section 44 is generally similar in arrangement and function to the intermediate section 12, though it differs in structural details and in the detailed method of attachment to the two trucks at opposite ends, as hereinafter pointed out.

The truck 43 includes a main or truck frame 45, important parts of which are shown separately in Fig. 9 of the drawings. Said frame 45 includes a U-shaped frame member 46 which provides a front bumper and support for the operator and a controller 47 and brake wheel 48, as best illustrated in Figs. 4 and 5 of the drawings. The parallel upstanding spaced-apart side plates of the frame 46 carry a rearwardly extending yoke 49 forming a rearwardly extending cantilever portion of the main frame 45, the function of which is pointed out hereinafter.

The truck 43 includes longitudinally spaced axles 50 and 51 which are provided with rigidly attached motor driven traction wheels 52 and 53, respectively, which axles 50 and 51 and wheels 52 and 53 are driven by electric motors 54 and 55, respectively, preferably through single reduction gearing. The motors 54 and 55 are journaled to the axles 50 and 51, respectively, and are supported on a pivot cross shaft 56.

Opposite ends of the axles 50 and 51 are journaled in self-aligning bearings which are mounted in a pair of laterally spaced longitudinally extending upright sub-frame or walking beam members 57; the axes of the axles 50 and 51 being held against all movement relative to the sub-frame members 57 except limited pivotal movement provided by the self-aligning bearings, while the axles 50 and 51 are, of course, free to rotate relatively thereto. The sub-frame members 57 are provided at opposite ends with similar bearing shoes 58 which bear against the inner walls of the upright side plates of the frame member 46 and the inner walls of parallel upright side plates of a yoke-type drawbar 59 which is illustrated in Fig. 8 of the drawings and which is described more completely hereinafter.

The left-hand shoes 58, as viewed in Figs. 4 and 5 of the drawings, obviously co-operate with the frame member 46 to maintain the sub-frame members 57 against lateral movement and thus hold axle 50 in proper position laterally with respect to the main frame 45. The right-hand shoes 58 similarly cooperate with the yoke 59 to position the axle 51.

At their centers, the sub-frame members 57 have square openings 60 which receive bearing blocks 61 for free up and down sliding movement, but which hold said bearing blocks 61 against movement in a horizontal plane.

The shaft 56 is provided with an enlarged boss 62 on each end which extends into a bearing block 61 and is pivotally mounted relative thereto. As a consequence, the shaft 56 is free to move up and down a limited amount with respect to each of the sub-frame members 57, but is held against longitudinal movement or movement in a horizontal plane relative thereto.

The bosses 62 of shaft 56 both extend through circular openings 63 in the yoke 49 of truck frame 45 and are keyed thereto by keys, one of which is seen at 64 in Fig. 4 of the drawings. The outer end of each of the bosses 62 is received in a bushed opening 65 (see Fig. 8) of the drawbar or yoke 59. Yoke or drawbar 59 is thus pivoted to the main frame 45 at spaced points for pivotal movement about a transversely extending horizontal axis which is also the axis of the shaft 56 and thus the axis about which the truck sub-frame 57 is pivotally mounted with respect to the main frame 45.

From the above description it is evident that the two axles 50 and 51 with their associated wheels 52 and 53 and motors 54 and 55 are mounted in the sub-frame 57 and with it can pivot about the axis of the shaft 56 with respect to the main frame 45 and also move upwardly and downwardly with respect thereto in a transverse upright plane passing through the axis of said shaft 56. Otherwise, the sub-frame 57 is held to move with the main frame 45. Each frame 57 can also pivot on shaft 56 independently of the other as provided by the self-aligning bearings for axles 50 and 51.

To provide for spring suspension of the main frame 45 with respect to the sub-frame 57, providing for limited tilting movement of the main frame about the axis of the shaft 56 as well as limited up and down movement thereof with respect to the sub-frame 57, there are four coil springs 66 interposed between the sub-frame members 57 and the main frame 45. There is one coil spring 66 adjacent each end of each of the sub-frame members 57 which is received and held by a boss 67 thereof (see Fig. 7).

The upper ends of the two left-hand springs 66, as viewed in Figs. 4 and 5, are received by downwardly extending bosses carried by a cross member 68 of the main frame 45. The right-hand springs 66, as viewed in Figs. 4 and 5 of the drawings, are received by similar downwardly extending bosses on the two right-hand projections of the yoke 49, as clearly illustrated in said Figs. 4 and 5.

The yoke-type drawbar 59 includes a pair of parallel spaced-apart upstanding plates or arms 59 which includes pivotal ears 70 which are provided with the previously mentioned openings 65 and provide the pivotal pulling and load supporting connection between the drawbar 59 and the main frame 45 on the transversely extending horizontal axis which is located substantially midway between the two pair of wheels 52 and 53, respectively, thus providing equal loading of said wheels 52 and 53.

Interconnecting the side plates 69 are top and bottom cross end plates 71 and 72 which are rigidly attached thereto. A casting 73 is provided with top and bottom trunnion connections 74 and 75 with the end plates 71 and 72 of the drawbar 59 and if desired may be considered as a portion thereof. The trunnion connections 74 and 75 provide a pivotal connection between the casting 73 and drawbar 59 on a vertical or upright axis. It is to be noted that this axis is located longitudinally outside the boundaries of truck wheels 52 and 53 and is thus outwardly of an upright transverse plane adjacent the outer peripheries of adjacent truck wheels 53, thus providing adequate articulation of a long locomotive so it can negotiate relatively sharp curves. Casting 73 is provided with a horizontal longitudinally extending bore which is preferably bushed to receive a tubular frame member 76 which constitutes the backbone or principal frame member of the intermediate section 44 and is rigidly attached to the casing or housing 77 thereof.

The tubular frame member 76 is free to rotate on a longitudinally extending horizontal axis with respect to the casting 73 and is held against longitudinal movement with respect thereto by virtue of a pair of rigidly attached removably spaced collars 78 and 79 which take reverse thrusts transmitted between the frame member 76 and the casting 73. It is obvious that the drawbar pull between the truck 43 and the intermediate section 44, and thus between the truck 43 at one end and a similar truck at the other end by way of intermediate section 44, is transferred through the tubular frame member 76, the casting 73 and its equivalent, and the yoke 59 of truck 43 and the equivalent yoke on the opposite end of the locomotive.

Since the tubular frame member 76 is free to rotate in the casting 73 and since the center of gravity of the casing or housing 77 is above the axis of the tube 76, spring supports are provided to hold the housing 77 against unlimited rotation about the axis of the shaft 56. This is provided by similar mechanism in each end of the housing 77 in the form of a forwardly extending plate 80 which is constructed to provide a pair of laterally spaced arms having spaced downwardly extending bosses which receive springs 81 which rest on and are supported by laterally extending wings 82 formed on the casting 73 and provided with spring receiving bosses. The two springs 81 are obviously on opposite sides of the axis of the tube 76 and consequently they will tend to hold the housing 77 against rotation on its shaft while permitting a limited amount of pivotal movement between the truck 43 and with it the drawbar 59 and the intermediate section 44 and ultimately the other supporting truck. In other words, since both the trucks are mounted for a limited amount of movement on a longitudinally extending horizontal axis with respect to the intermediate section 44, they are so mounted with respect to each other.

The connections above described between the truck 43 and the intermediate section 44 are duplicated between the complementary truck and the opposite end of the intermediate section 44. It is to be noted that in general the flexibility of the locomotive of Figs. 4 to 9, inclusive, is similar to that of the locomotive of Figs. 1, 2 and 3, and substantially all of the general description of the latter will apply to it. Certain differences, however, are obvious.

For example, the yoke-type drawbar 59 is pivoted to the frame 45 of the truck only on a transversely extending horizontal axis. The drawbar 59 is rigid against any pivotal movement with respect to the intermediate section 44 on any transverse horizontal axis, but, unlike the locomotive of Figs. 1, 2 and 3, there is a pivotal connection between the frame of the intermediate section 44 and the drawbar. That is, frame 76 is pivotally connected to drawbar 59 about a horizontal longitudinally extending axis, while in the locomotive of Figs. 1, 2 and 3, intermediate section 12 is rigid with respect to the drawbar 35 about the longitudinally extending horizontal axis.

Also in the locomotive of Figs. 4 to 9 there are only two, as distinguished from four, axes of vertical connection between the three sections. That is, intermediate section 44 is connected at one end to one of the trucks about a single upright axis which is the upright axis of the casting 73. A similar pivotal connection is provided between the opposite end of the intermediate section 44 and the other truck which is complementary to truck 43.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A locomotive including a pair of longitudinally spaced end frames, two pairs of motor driven traction and supporting wheels for each end frame, an intermediate frame supported by said end frames, means providing a pivotal connection between each end of said intermediate frame and its supporting end frame, each said means including drawbar mechanism pivotally connected at one end thereof to said intermediate frame about a vertical axis which is spaced from the supporting end frame and which is rigid against pivotal movement on a transverse horizontal axis, and means providing for pivotal movement between the other end of said drawbar mechanism and said end frame at a position longitudinally between said pairs of wheels and in an upright plane.

2. A locomotive including a pair of longitudinally spaced end frames, two pairs of motor driven traction and supporting wheels for each end frame, an intermediate frame supported by said end frames, means providing a pivotal connection between each end of said intermediate frame and its supporting end frame, each said means including drawbar mechanism pivotally connected at one end thereof to said intermediate frame about a vertical axis which is spaced from the supporting end frame and which is rigid against pivotal movement on a transverse horizontal axis, and means providing a universal connection between the other end of said drawbar mechanism and said end frame at a position between said pairs of wheels.

3. A locomotive including a pair of end frames, two pairs of motor driven traction wheels for each end frame, an intermediate locomotive control means supporting frame, means interconnecting each end of said intermediate frame to one of said end frames and supporting it therefrom, said means including a drawbar for each end of said intermediate frame, means pivotally connecting one end of each drawbar to said intermediate frame for pivotal movement about an upright axis, means providing a universal connection between the other end of each drawbar and one of said end frames intermediate its traction wheels, abutment means providing for limited horizontal swinging between each drawbar and associated end frame, and spring means between each drawbar and the adjacent end frame resiliently holding it against rotation on a longitudinal horizontal axis.

4. A locomotive including a pair of end frames, two pairs of motor driven traction wheels for each end frame, an intermediate locomotive control means supporting frame, means interconnecting each end of said intermediate frame to one of said end frames and supporting it therefrom, said means including a drawbar for each end of said intermediate frame, means pivotally connecting one end of each drawbar to said intermediate frame for pivotal movement about an upright axis, means providing a universal connection between the other end of each drawbar and one of said end frames intermediate its traction wheels, and spring means between each drawbar and the adjacent end frame resiliently holding it against rotation on a longitudinal horizontal axis.

5. A locomotive including a pair of end frames, two pairs of motor driven traction wheels for each end frame, an intermediate locomotive control means supporting frame, means interconnecting each end of said intermediate frame to one of said end frames and supporting it therefrom, said means including a drawbar for each end of said intermediate frame, means pivotally connecting one end of each drawbar to said intermediate frame for pivotal movement about an upright axis, means providing a pivotal connection between the other end of each drawbar and one of said end frames intermediate its traction wheels whereby said drawbar may swing in an upright plane, and abutment means providing for limited horizontal swinging between each drawbar and associated end frame.

6. A locomotive including a pair of end frames, two pairs of motor driven traction wheels for each end frame, an intermediate locomotive control means supporting frame, means interconnecting each end of said intermediate frame to one of said end frames and supporting it therefrom, said means including a drawbar for each end of said intermediate frame, means pivotally connecting one end of each drawbar to said intermediate frame, for pivotal movement about an upright axis located outside the boundaries of said traction wheels, and means providing a load supporting and pulling pivotal connection on a horizontal axis between the other end of each drawbar and one of said end frames substantially midway between its pairs of traction wheels.

7. A locomotive including a pair of end frames, two pairs of motor driven traction wheels for each end frame, an intermediate locomotive control means supporting frame, means interconnecting each end of said intermediate frame to one of said end frames and supporting it therefrom, said means including a drawbar for each end of said intermediate frame, means pivotally connecting one end of each drawbar to said intermediate frame for pivotal movement about an upright axis, and means providing a pivotal connection between the other end of each drawbar and one of said end frames intermediate its traction wheels whereby said drawbar may swing in an upright plane, each drawbar extending in part below the axis of rotation of one pair of traction wheels of the associated end frame.

8. A locomotive including a pair of end frames, two pairs of motor driven traction wheels for each end frame, an intermediate frame, means connecting each end of said intermediate frame to one of said end frames and supporting it therefrom on a horizontal axis between said two pairs of traction wheels, each said means including a yoke type drawbar pivoted to an end frame on a horizontal axis intermediate pairs of said traction wheels and extending laterally of a pair of said traction wheels, and means pivotally connecting said drawbar to said intermediate frame on an upright axis.

9. A locomotive including a pair of end frames, two pairs of motor driven traction wheels for each end frame, an intermediate frame, means connecting each end of said intermediate frame to one of said end frames and supporting it therefrom at a position substantially midway between said two pairs of traction wheels, each said means including a yoke type drawbar pivoted to an end frame on a horizontal axis substantially midway between said two pairs of traction wheels and extending laterally of a pair of said traction wheels, and means pivotally connecting said drawbar to said intermediate frame on an upright axis.

10. A locomotive including a pair of end frames, two pairs of motor driven traction wheels for each end frame, an intermediate frame, means connecting each end of said intermediate frame to one of said end frames and supporting it therefrom, each said means including a yoke type drawbar having a pair of arms pivoted to an end frame on a horizontal axis intermediate pairs of said traction wheels, said arms extending laterally outside of a pair of said traction wheels, and means pivotally connecting said drawbar to said intermediate frame on both an upright axis and a horizontal longitudinally extending axis.

11. A locomotive including a pair of end frames, two pairs of motor driven traction wheels for each end frame, an intermediate frame, means connecting each end of said intermediate frame to one of said end frames and supporting it therefrom, each said means including a yoke type drawbar having a pair of arms pivoted to an end frame on a horizontal axis and extending laterally outwardly of a pair of said traction wheels, and means pivotally connecting said drawbar to said intermediate frame on an upright axis.

12. A locomotive including a pair of end frames, two pairs of motor driven traction wheels for each end frame, an intermediate frame, means connecting each end of said intermediate frame to one of said end frames and supporting it therefrom substantially midway between pairs of said traction wheels, each said means including a yoke type drawbar pivoted to an end frame on a horizontal axis substantially midway between pairs of said traction wheels and extending laterally of a pair of said traction wheels, means pivotally connecting said drawbar to said intermediate frame on both an upright axis and a horizontal longitudinally extending axis, a control supporting body on said intermediate frame, and spring means resiliently holding said intermediate frame against rotation on a horizontal longitudinally extending axis relative to said yoke.

13. A locomotive including a pair of end frames, two pairs of motor driven traction wheels for each end frame, an intermediate frame, means connecting each end of said intermediate frame to one of said end frames and supporting it therefrom substantially midway between pairs of traction wheels, each said means including a yoke type drawbar pivoted to an end frame on a horizontal axis substantially midway between pairs of said traction wheels and extending laterally of a pair of said traction wheels, means pivotally connecting said drawbar to said intermediate frame on both an upright axis and a horizontal longitudinally extending axis, and spring means resiliently holding said intermediate frame against rotation on a horizontal longitudinally extending axis relative to said yoke.

14. A locomotive including a pair of longitudinally spaced trucks, an intermediate control supporting frame, each of said trucks including two pairs of motor driven traction wheels, each pair being on a transverse axle, a frame receiving each axle, another frame, means pivotally mounting said first frame to said second frame for pivotal movement on a transverse horizontal axis intermediate said axles and for up and down movement of said axis, springs on opposite sides of said axis interposed between said two frames whereby the second frame is pivotally connected to and resiliently supported by the first frame, and means including a yoke type drawbar interconnecting each truck with one end of said intermediate frame, said yoke being pivotally connected to the truck on the aforementioned transverse horizontal axis, said drawbar also including a member providing connection with said intermediate frame on an upright axis and on a horizontal longitudinally extending axis.

15. A locomotive including a pair of longitudinally spaced trucks, an intermediate control supporting frame, each of said trucks including two pairs of motor driven traction wheels, each pair being on a transverse axle, a frame receiving each axle, another frame, means pivotally mounting said first frame to said second frame for pivotal movement on a transverse horizontal axis intermediate said axles and for up and down movement of said axis, spring means on opposite sides of said axis interposed between said two frames whereby the second frame is pivotally connected to and resiliently supported by the first frame, and means including a yoke type drawbar interconnecting each truck with one end of said intermediate frame, said yoke being pivotally connected to the truck on a transverse horizontal axis, said drawbar also including a member providing connection with said intermediate frame on an upright axis and on a horizontal longitudinally extending axis.

16. A locomotive including a pair of end trucks each having at least four driving wheels, an intermediate frame member connecting said trucks, and drawbar means connecting each end truck to an adjacent end of said intermediate member including means providing pivotal movement about a transverse horizontal axis located substantially midway between the wheels of each truck and about an upright axis located outside the boundaries of said truck wheels.

17. A locomotive including a pair of longitudinally spaced trucks, an intermediate control supporting frame, each of said trucks including two pairs of motor driven traction wheels, each pair being on a transverse axle, a frame receiving each axle, another frame, means pivotally mounting said first frame to said second frame for pivotal movement on a transverse horizontal axis intermediate said axles and for up and down movement of said axis, spring means on opposite sides of said axis interposed between said two frames whereby the second frame is pivotally connected to and resiliently supported by the first frame, and means including a yoke type drawbar interconnecting each truck with one end of said intermediate frame, said yoke being pivotally connected to the truck on a transverse horizontal axis, said drawbar also including a member providing connection with said intermediate frame on an upright axis.

ARTHUR L. LEE.

REFERENCES CITED

The following references are of record in the file of this patent:

UNITED STATES PATENTS

| Number | Name | Date |
| --- | --- | --- |
| 755,460 | Dalton et al. | Mar. 22, 1904 |
| 909,430 | Levin | Jan. 12, 1909 |
| 912,303 | Garratt | Feb. 16, 1909 |
| 1,195,723 | Pratt | Aug. 22, 1916 |
| 1,389,076 | Sloane | Aug. 30, 1921 |

FOREIGN PATENTS

| Number | Country | Date |
| --- | --- | --- |
| 218,246 | Great Britain | Mar. 5, 1925 |
| 323,723 | Great Britain | Jan. 6, 1930 |
| 508,005 | Germany | Sept. 24, 1930 |